United States Patent
Kastner et al.

(10) Patent No.: US 10,443,665 B2
(45) Date of Patent: Oct. 15, 2019

(54) PULLEY DECOUPLER

(71) Applicant: SCHAEFFLER TECHNOLOGIES AG & CO. KG, Herzogenaurach (DE)

(72) Inventors: Michael Kastner, Erlangen (DE); Roland Arneth, Eggolsheim (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 152 days.

(21) Appl. No.: 15/550,353

(22) PCT Filed: Jan. 28, 2016

(86) PCT No.: PCT/DE2016/200059
§ 371 (c)(1),
(2) Date: Aug. 10, 2017

(87) PCT Pub. No.: WO2016/127990
PCT Pub. Date: Aug. 18, 2016

(65) Prior Publication Data
US 2018/0031057 A1 Feb. 1, 2018

(30) Foreign Application Priority Data
Feb. 12, 2015 (DE) .................. 10 2015 202 531

(51) Int. Cl.
*F16D 41/20* (2006.01)
*F16D 13/76* (2006.01)
(Continued)

(52) U.S. Cl.
CPC ........... *F16D 41/206* (2013.01); *F16D 13/76* (2013.01); *F16H 55/36* (2013.01); *F16D 3/12* (2013.01); *F16D 3/72* (2013.01); *F16H 2055/366* (2013.01)

(58) Field of Classification Search
CPC .......... F16D 41/206; F16D 13/76; F16D 3/12; F16D 3/72; F16H 55/36; F16H 2055/366
See application file for complete search history.

(56) References Cited

U.S. PATENT DOCUMENTS 7,766,774 B2 * 8/2010 Antchak ................. F16D 7/022
474/74
8,047,920 B2 11/2011 Jansen et al.
(Continued)

FOREIGN PATENT DOCUMENTS

| CN | 102483028 A | 5/2012 |
| CN | 103511155 A | 1/2014 |

(Continued)

OTHER PUBLICATIONS

International Search Report for International Application No. PCT/DE2016/200059 dated Aug. 1, 2016.
(Continued)

*Primary Examiner* — Tinh T Dang
(74) *Attorney, Agent, or Firm* — Brooks Kushman P.C.

(57) ABSTRACT

A belt pulley decoupler includes a belt pulley, a hub to be fixed on the shaft, and a series connection made up of a decoupler spring and a wrap-around band arranged in the drive torque flow between the belt pulley and the hub. The wrap-around band extends about direction of the axis of rotation of the belt pulley decoupler and is arranged radially between the belt pulley and the decoupler spring. Under transmission of the drive torque, both ends of the wrap-around band widen radially, with one end of the wrap-around band being braced against the inner surface of a first sleeve that is rotationally fixed in the belt pulley, and another end being braced against the inner surface of a second sleeve that is rotatable within the belt pulley.

15 Claims, 6 Drawing Sheets

(51) Int. Cl.
*F16D 3/12* (2006.01)
*F16D 3/72* (2006.01)
*F16H 55/36* (2006.01)

(56) References Cited

U.S. PATENT DOCUMENTS

| | | | |
|---|---|---|---|
| 8,613,680 | B2* | 12/2013 | Frankowski .......... F16H 7/1218 474/135 |
| 8,678,157 | B2* | 3/2014 | Ward ..................... F16D 7/022 192/41 R |
| 8,985,293 | B2* | 3/2015 | Marion ................... F16D 13/76 192/113.32 |
| 9,140,319 | B2* | 9/2015 | Williams .............. F16D 41/206 |
| 9,611,928 | B2* | 4/2017 | Li .......................... F16H 55/36 |
| 9,638,270 | B2* | 5/2017 | Antchak ................. F16D 7/022 |
| 9,651,099 | B2* | 5/2017 | Antchak ................. F16D 43/24 |
| 9,850,997 | B2* | 12/2017 | Cariccia .............. F16F 15/1216 |
| 2003/0098214 | A1 | 5/2003 | Titus et al. |
| 2004/0112700 | A1 | 6/2004 | Liston et al. |
| 2005/0250607 | A1* | 11/2005 | Jansen ................... F02B 67/06 474/74 |
| 2011/0065537 | A1 | 3/2011 | Serkh et al. |
| 2013/0217524 | A1* | 8/2013 | Antchak ................ F02B 67/06 474/94 |
| 2014/0329631 | A1 | 11/2014 | Mevissen et al. |
| 2015/0167816 | A1 | 6/2015 | Li |

FOREIGN PATENT DOCUMENTS

| | | |
|---|---|---|
| DE | 10103082 A1 | 4/2002 |
| DE | 102009052611 A1 | 5/2011 |
| JP | 2014515465 A | 6/2014 |
| WO | 2011147024 A1 | 12/2011 |
| WO | 2014198086 A1 | 12/2014 |

OTHER PUBLICATIONS

International Search Report for International Application No. PCT/DE2016/200060 dated Apr. 18, 2016.

* cited by examiner

PULLEY DECOUPLER

CROSS-REFERENCE TO RELATED APPLICATIONS

This application is the U.S. National Phase of PCT/DE2016/200059 filed Jan. 28, 2016, which claims priority to DE 102015202531.4 filed Feb. 12, 2015, the entire disclosures of which are incorporated by reference herein.

TECHNICAL FIELD

This disclosure relates to a belt pulley decoupler for transmitting a drive torque from the belt of an auxiliary unit belt drive to the shaft of one of the auxiliary units.

BACKGROUND

As known, torsional vibrations and cyclic irregularities which are introduced by the crankshaft of an internal combustion engine into its auxiliary unit belt drive can be compensated by belt pulley decouplers, usually designated as decouplers in English, and typically configured as generator belt pulleys. The wrap-around band serves as a one-way clutch which, in the engaged state transmits the drive torque from the belt pulley to the hub, and the elasticity of the decoupler spring connected in series with the decoupler spring smooths the cyclic irregularities originating in the belt drive. When the rotation of the belt pulley is retarded, the wrap-around band disengages, so that, in reverse, no noteworthy torque can be transmitted from the hub to the belt pulley, so that the inert generator shaft can overrun the belt pulley.

DE 10 2009 052 611 A1 discloses a belt pulley decoupler in which the wrap-around band is arranged radially on the inside and the decoupler spring configured as a coil torsion spring is arranged radially on the outside.

A generic type of belt pulley decoupler with an exchanged radial arrangement of the wrap-around band and the coil torsion spring with respect to the above arrangement is disclosed for example in U.S. Pat. No. 8,047,920 B2. Based on this, it is the object of the present disclosure to propose a belt pulley decoupler of the type described above with an alternative constructive configuration.

SUMMARY

This disclosure achieves the above object through the features described in claim 1. According to these features, under transmission of a drive torque, both ends of the wrap-around band widen radially, the first end of the wrap-around band that extends on the belt pulley-side in the drive torque flow being braced against the inner peripheral surface of a first sleeve that is rotationally fixed in the belt pulley, and the second end of the wrap-around band which extends on the decoupler spring-side in the drive torque flow being braced against the inner peripheral surface of a second sleeve that is rotatable within the belt pulley.

In contrast to the pre-cited prior art, the belt pulley decoupler of the invention comprises two sleeves into which the wrap-around band widening radially under load loops into with both ends and transmits the drive torque. As a result, the wrap-around band-ends of the components coupled with the wrap-around band on the drive-side and on the output-side can possess simple and economically manufacturable contact geometries. In the preferred embodiment of a legless and, thus, fully cylindrical wrap-around band, the inner peripheral surfaces of both the sleeves can also be fully cylindrical, so that the drive torque is transmitted exclusively through frictional contact forces between the outer peripheral surface of the wrap-around band and the inner peripheral surface of the two sleeves.

Both sleeves and, if need be, a further third sleeve that transmits the drive torque from the decoupler spring to the hub, can be economically manufacturable sheet metal shaped parts, the first sleeve and the third sleeve being preferably pressed into the belt pulley or, if necessary, pressed onto the hub. In addition, this type of construction with sleeves makes it possible for the inner diameter of the belt pulley and the outer diameter of the hub to be made (turned) economically, substantially without, or, at the most, with only small diameter graduations.

BRIEF DESCRIPTION OF THE DRAWINGS

Further features of this disclosure will become obvious from the following description and the attached drawings in which an example of embodiment of a belt pulley decoupler according to this disclosure for the generator arranged in the auxiliary unit belt drive of an internal combustion engine.

DETAILED DESCRIPTION

Figure 1:
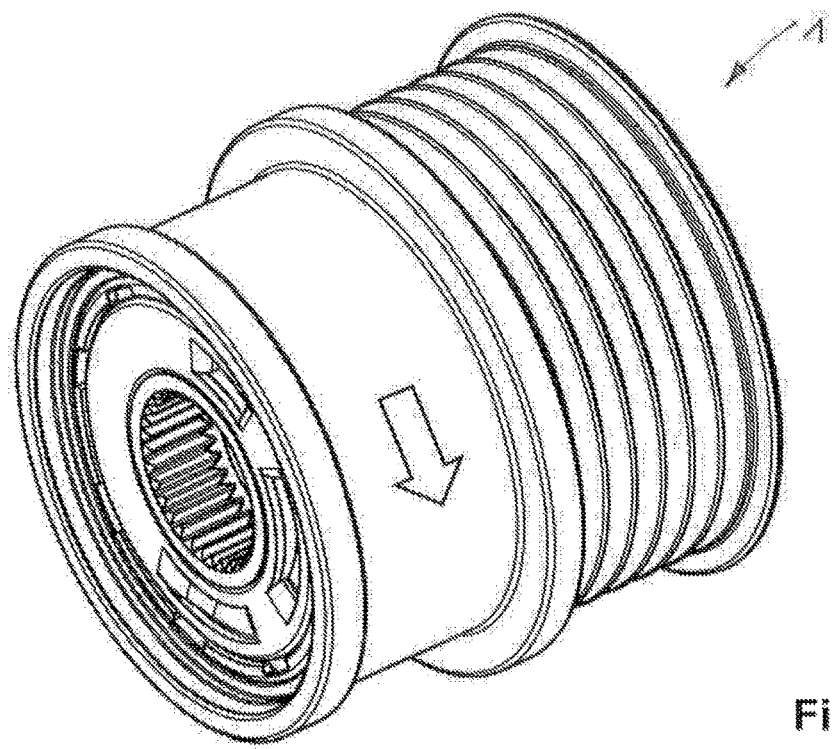
FIG. 1 illustrates a belt pulley decoupler in a perspective view.
Figure 2:
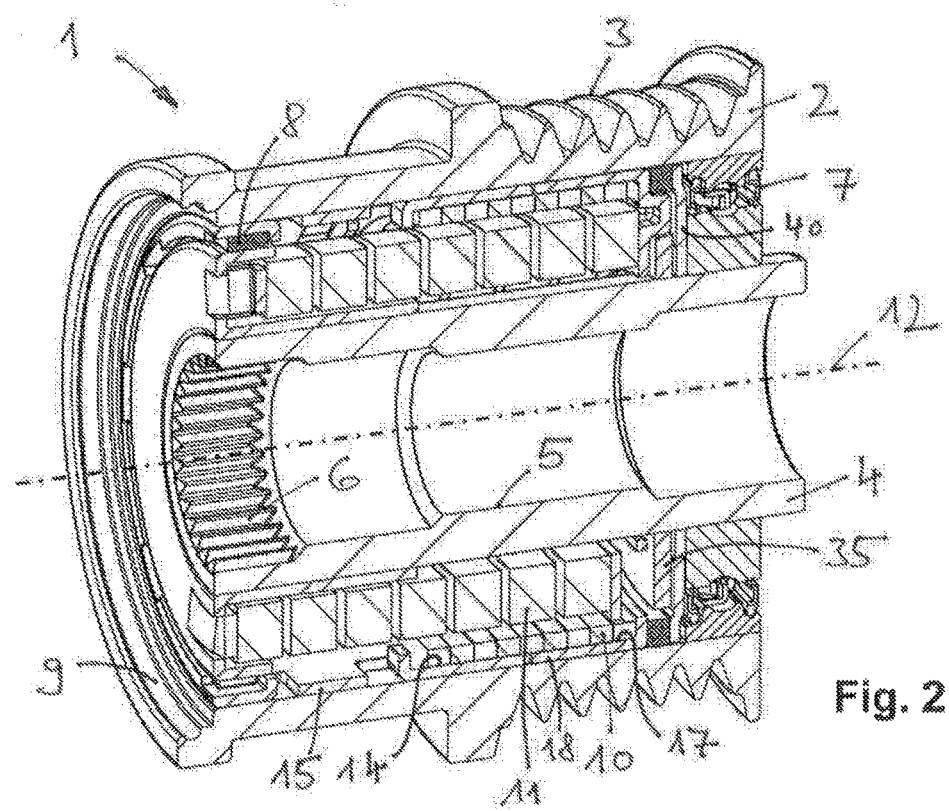
FIG. 2, illustrates the belt pulley decoupler in a perspective longitudinal cross-sectional view.
Figure 3:
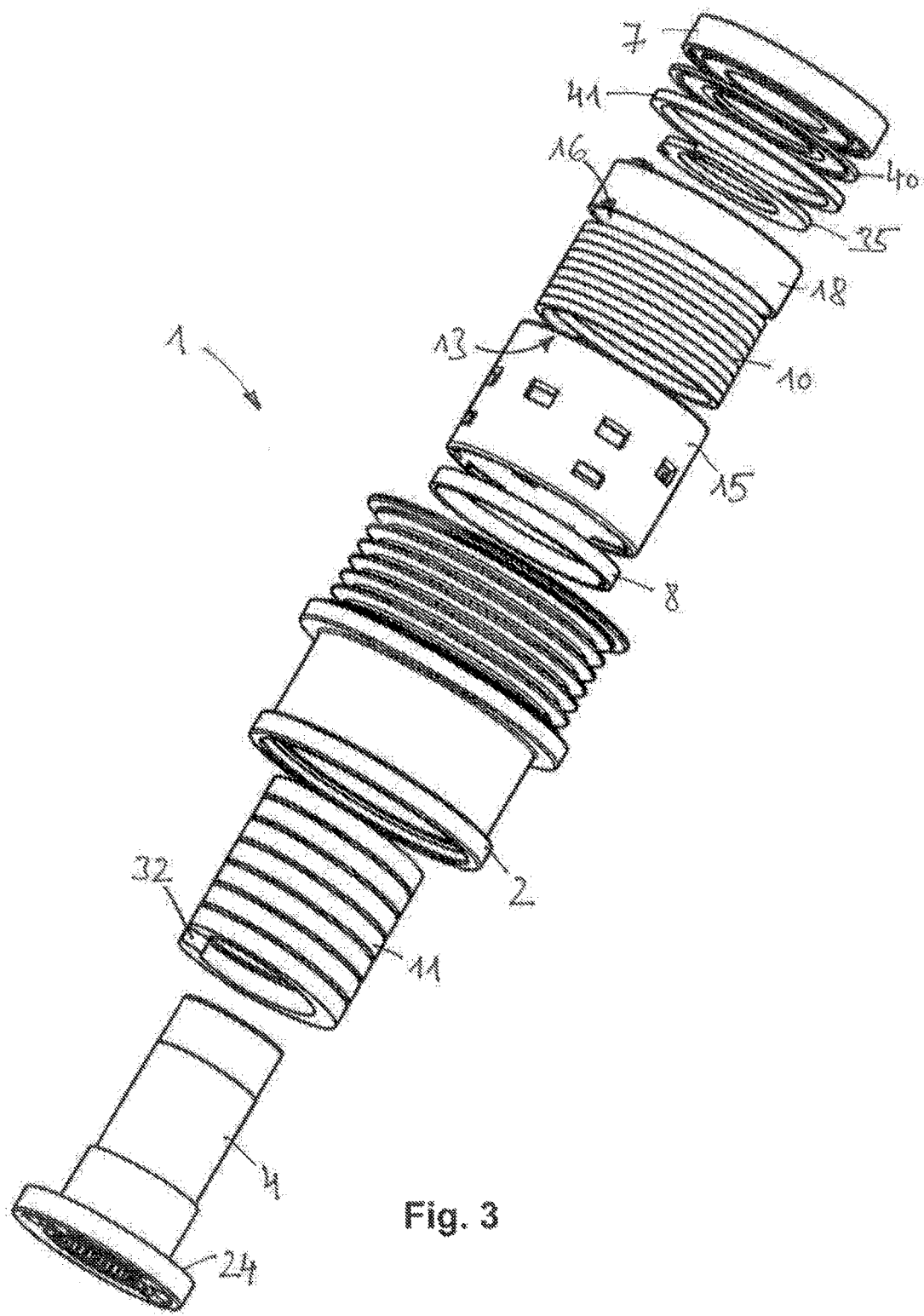
FIG. 3 illustrates the belt pulley decoupler in an exploded view.

FIGS. 1 to 3 show the belt pulley decoupler 1, referred to hereinafter as decoupler 1, in various perspective representations, namely as a complete entity in FIG. 1, in a longitudinal cross-section in FIG. 2 and as an exploded representation in FIG. 3. A hollow cylindrical belt pulley 2, whose outer peripheral surface 3 is wrapped around by the belt and profiled in correspondence to the poly-V-shape of the belt, is driven by the belt in the direction of rotation shown graphically in FIG. 1. The belt pulley 2 is rotatably mounted on a hub 4 that is fixedly screwed onto the generator shaft. For this purpose, the hub 4 possesses in its the central portion 5 an inner thread, not shown, and on its generator-distal front end portion, a polygonal toothing 6 as an engagement contour for the screwing tool. Mounting of the belt pulley 2 on the hub 4 is realized radially and axially on the generator-side end with help of a rolling bearing 7, and on the generator-distal end radially with help of a sliding bearing 8. The rolling bearing 7 is a one-row ball bearing sealed on both sides, and the sliding bearing 8 is a radial bearing ring made of polyamide. The inner diameter of the belt pulley 2 is uniform throughout the entire region between the radial bearing ring 8 and the ball bearing 7, so that this inner diameter region is accessible for a particularly simple and economic turning machining. It is only on the generator-distal end, that the belt pulley 2 possesses a widening 9 with a graduated diameter into which, after the mounting of the decoupler 1 on the generator, a protection cap, not shown, is snapped in.

The decoupler 1 includes a one-way clutch 10 and a decoupler spring 11 connected—with respect to the drive torque flow from the belt pulley 2 to the hub 4—in series with the one-way clutch 10. The one-way clutch 10 is a wrap-around band and the decoupler spring 11 is a coil torsion spring, both of which extend in direction of the axis of rotation 12 of the decoupler 1. In the present example, the coil torsion spring 11 and the wrap-around band 10 are coaxial with the axis of rotation 12, the wrap-around band 10 extending in the radial annular space between the belt pulley 2 and the coil torsion spring 11.

The clockwise wound wrap-around band 10 and the counter-clockwise wound coil torsion spring 11 are both wholly cylindrical in shape and have legless ends on both sides, which legs, as a consequence, widen the wrap-around band and the coil torsion spring respectively in radial direction during transmission of the drive torque. During this process, the first end 13 of the wrap-around band arranged on the belt pulley-side in the drive torque flow gets braced against the cylindrical inner peripheral surface 14 of a first sleeve 15 that is rotationally fixed in the belt pulley 2. The second end 16 of the wrap-around band extending on the coil torsion spring-side in the drive torque flow gets braced against the cylindrical inner peripheral surface 17 of a second sleeve 18 that is rotatably arranged in the belt pulley 2. Thus, the drive torque introduced by the belt pulley 2 is introduced into the coil torsion spring 11 and transmitted from there to the hub 4 exclusively through static friction, on the one side, between the inner peripheral surface 14 of the first sleeve 15 and the first end 13 of the wrap-around band 10 and, on the other side, between the second end 16 of the wrap-around band 10 and the inner peripheral surface 17 of the second sleeve 18.

At reversal of the drive torque, the wrap-around band 10 enables an overrunning of the generator shaft and of the hub 4 fixed thereon with respect to the belt pulley 2. In this state, the wrap-around band 10 contracts to its (non-loaded) original outer diameter and slips-through in one of the two sleeves 15, 18 and, during this, the transmittable drive torque is reduced to the level of the sliding friction torque prevailing between the two slipping-through contact partners.

Figure 4:
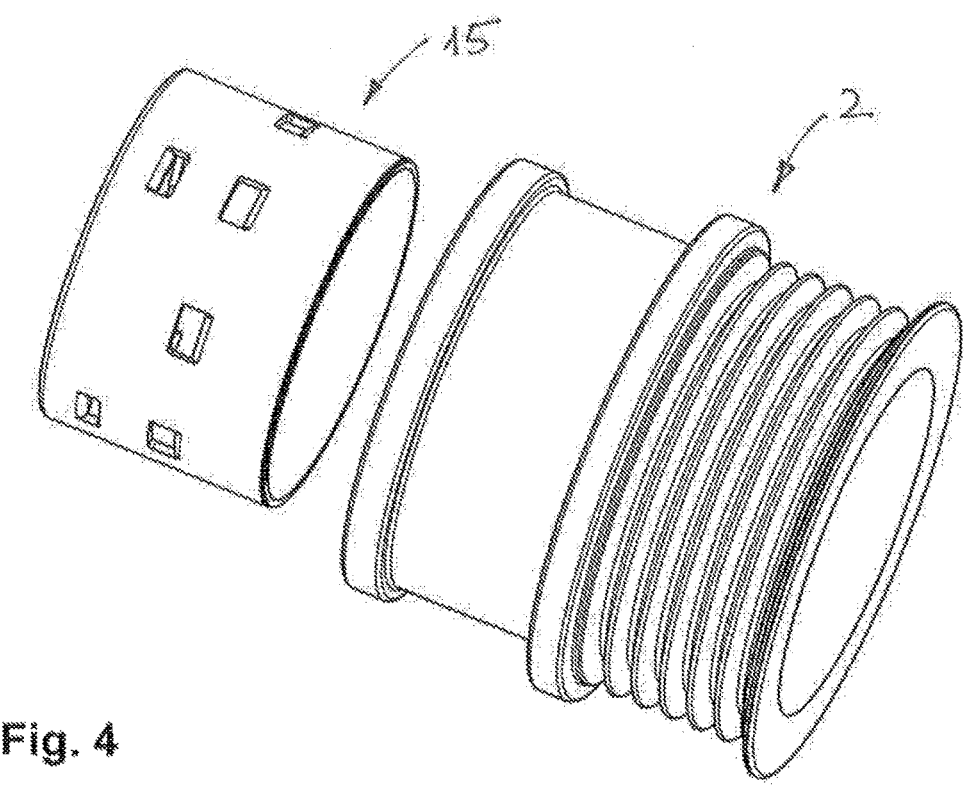
FIG. 4 illustrates a component group made up of the belt pulley and the first sleeve in an exploded view.
Figure 5:
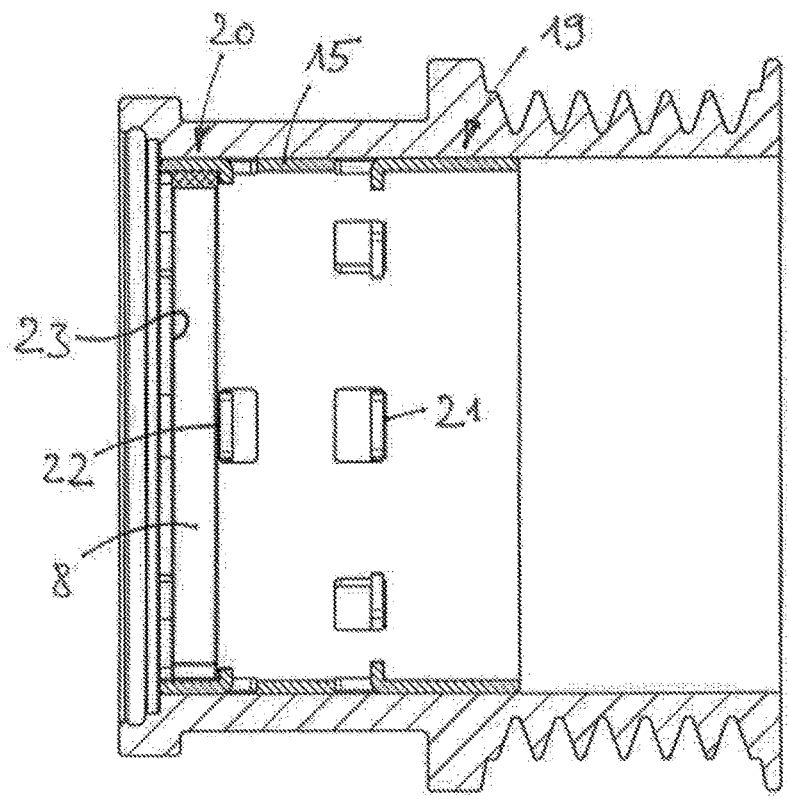
FIG. 5 illustrates the component group of FIG. 4 in a longitudinal cross-sectional view.

FIGS. 4 and 5 show an exploded and a longitudinal cross-sectional view, respectively of the sub-assembly made up of the belt pulley 2, the first sleeve 15 pressed onto the inner diameter of the pulley and the radial bearing ring 8. As recognizable in a combined viewing with FIG. 2, the first sleeve 15 has a first axial portion 19 in which the first end 13 of the wrap-around band extends, and a second axial portion 20 in which the radial bearing ring 8 is received. In one embodiment, the first sleeve 15 is a sheet metal shaped part and comprises on its periphery radially inwards formed projections that constitute axial stops 21, 22 and 23. The first axial portion 19 is delimited by the axial stop 21 for the wrap-around band 10, and the second axial portion 20 is delimited on both sides by the axial stops 22 and 23 respectively for the radial bearing ring 8. For the purpose of mounting between the two axial stops 22, 23 the radial bearing ring 8 is slit on its periphery.

Figure 6:
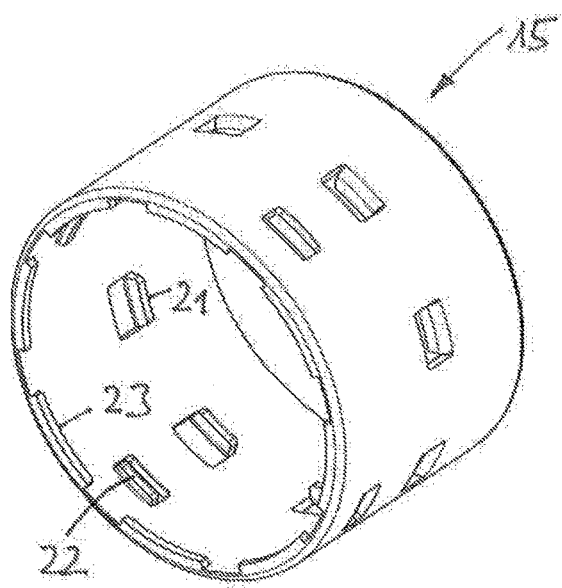
FIG. 6 illustrates the first sleeve in a perspective representation.

Each of the projections of the first sleeve 15, shown as an enlarged separate part in FIGS. 4 to 6, forming the axial stops 21, 22, comprises a plurality of local stampings in the peripheral surface of the sleeve, and the outer axial stop 23 for the radial bearing ring 8, comprises a collar with a plurality of circumferentially spaced segments.

Figure 7:
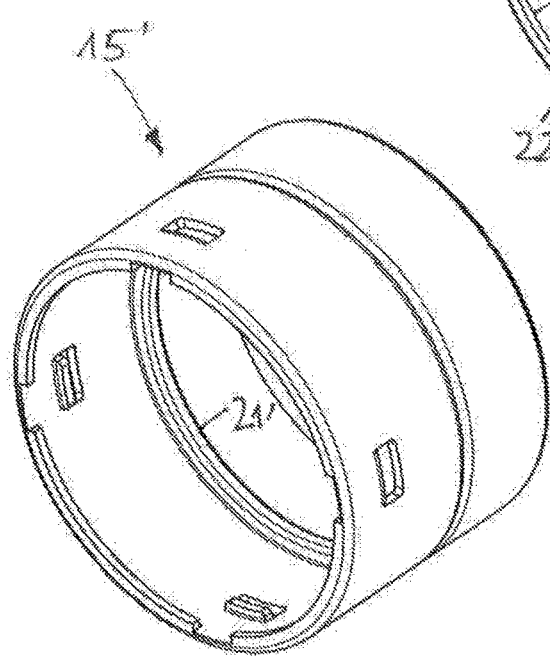
FIG. 7 illustrates an alternative first sleeve in a perspective view.
Figure 8:
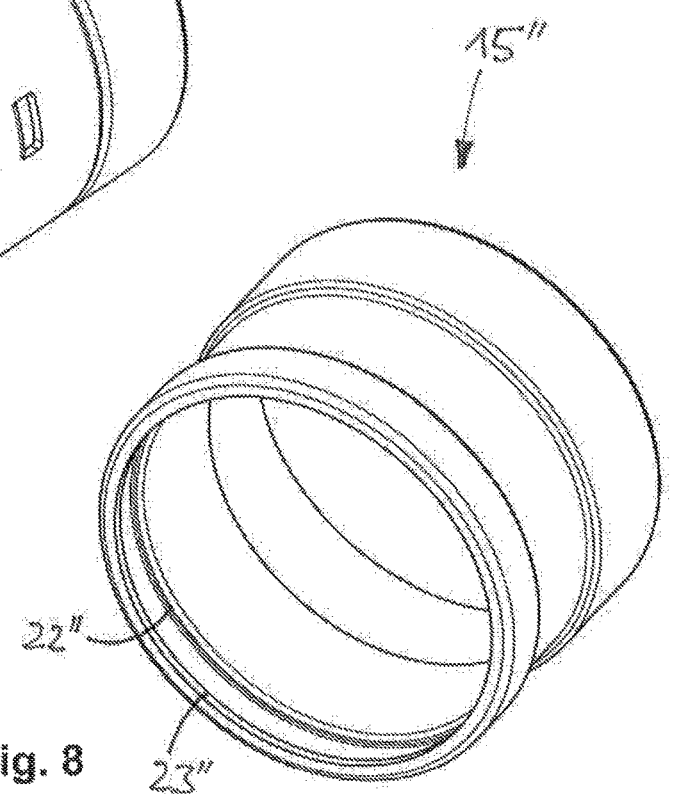
FIG. 8 illustrates a further alternative first sleeve in a perspective view.

The first sleeves 15' and 15" according to FIGS. 7 and 8 possess an alternative configuration to the above described configuration. In the case of the first sleeve 15', the axial stop 21' for the wrap-around band 10 is replaced with a roller-burnished step extending along the periphery of the sleeve and, in the case of the first sleeve 15", additionally, the inner axial stop 22" for the radial bearing ring 8 is also replaced with such a roller-burnished step. Besides this, the outer axial stop 23" for the radial bearing ring 8 is made in form of a peripherally continuous collar.

In a further alternative embodiment, (not shown), the second axial portion 20 of the then adequately shortened sleeve 15 can also be omitted, so that, in this case, the radial bearing ring 8 would be received directly on the inner diameter of the belt pulley 2.

Figure 9:
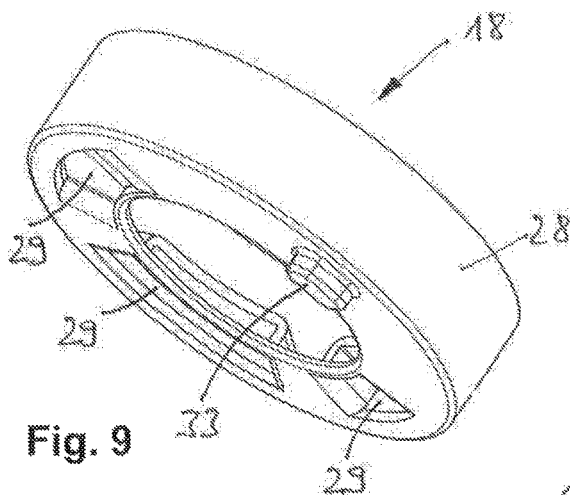
FIG. 9 illustrates a second sleeve in a perspective view.
Figure 10:
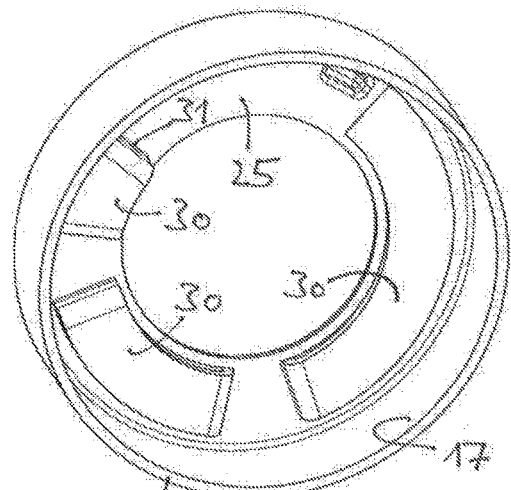
FIG. 10 illustrates the second sleeve in an opposing perspective view.
Figure 11:
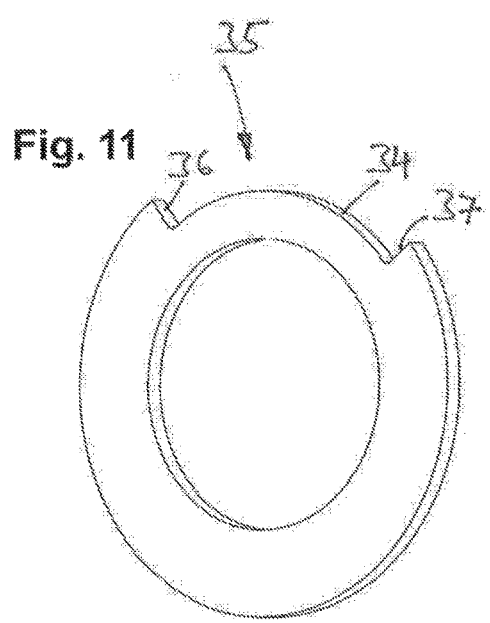
FIG. 11 illustrates an entraining disk in a perspective view.
Figure 13:
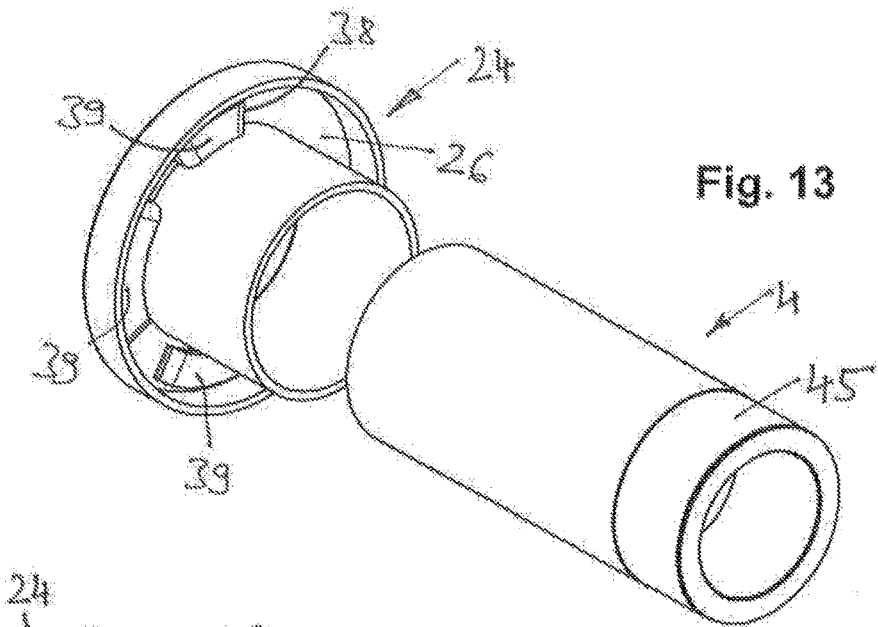
FIG. 13 illustrates a component group made up of hub and the third sleeve in an exploded view.
Figure 14:
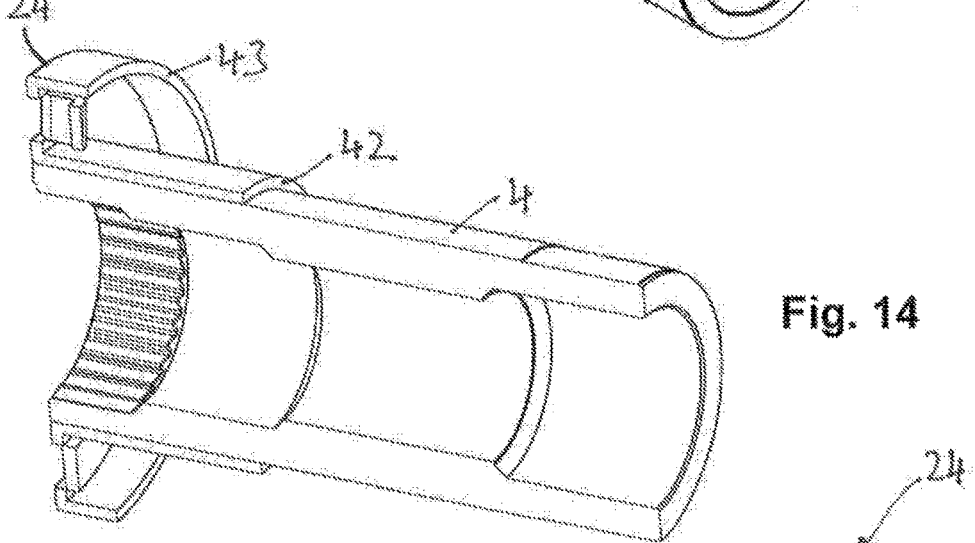
FIG. 14 illustrates the component group of FIG. 13 in a perspective view.
Figure 15:
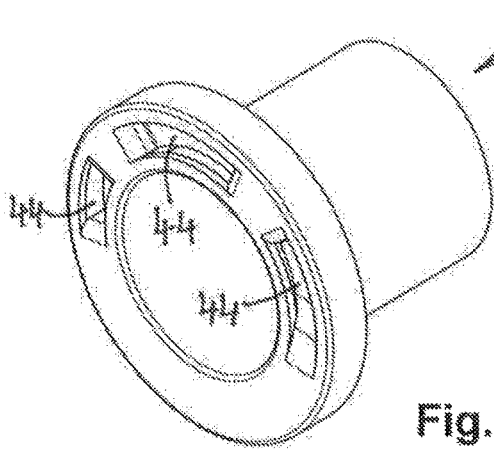
FIG. 15 illustrates a third sleeve in a perspective representation.
Figure 16:
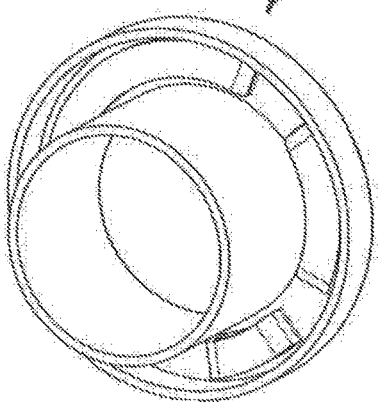
FIG. 16 illustrates the third sleeve in an opposing perspective representation.

The coil torsion spring 11 is clamped-in between the second sleeve 18 and a third sleeve 24 (see FIG. 13) with a slight axial bias. The sleeves 18, 24 are likewise sheet metal shaped parts and comprise, each one, a collar 25 and 26 respectively that contact the associated and, according to FIG. 3, legless ends of the coil torsion spring 11. The second sleeve 18, shown as an enlarged separate part in FIGS. 9 and 10, comprises an outer ring 27 in whose inner peripheral surface 17 the second end 16 of the coil torsion spring is looped and on whose outer peripheral surface 28 the second sleeve 18 is rotatably mounted on the inner diameter of the belt pulley 2. The collar 25 is provided with three stampings 29 formed thereon that form an axial ramp-shaped ascending spring support surface 30. This enables the torque introduction into the coil torsion spring end resting directly thereon.

The peripherally spaced stampings 29 are circular arc-shaped with the length of their arcs shortening with increasing axial elevation. Thus, the transmission of the drive torque takes place from the step 31, descending at the stamping 29 with the shortest arc length, to the front face of the coil torsion spring end resting thereon and radially widening the coil torsion spring. In one embodiment, this front face is formed exactly like the front face 32, visible in FIG. 3, of the other end of the coil torsion spring. Alternatively to the (laterally open) stampings 29, it is also conceivable for the spring support surface 30 to be formed by one or more (laterally closed) beads.

The front face of the collar 25 of the second sleeve 18 turned away from the coil torsion spring 11 comprises a projection 33 formed thereon that engages into a circular arc-shaped recess 34 of an entraining disk 35 according FIG. 5 seated non rotatably on the hub 4 and able to pivot between the peripheral ends 36 and 37 of the recess 34. The peripheral end 36 lagging in direction of the rotation of the decoupler 1 is positioned such that, in overrunning operation of the generator and against the friction torque of the then slipping-through wrap-around band 10, this end 36 entrains the second sleeve 18 via the projection 33. In this state, the second sleeve 18 and the hub 4, together with the third sleeve 24 fixed non-rotatably fixed thereon, rotate, as it were, as a rigid unit and thus prevent the so-called "ramp-up" of the ends of the coil torsion spring. This event threatens to occur when the second sleeve 18 and the third sleeve 24 twist relative to each other upon peripheral relaxation of the coil torsion spring 11, so that one or both front faces 32 of the coil torsion spring ends move away from the steps 31 and 38 of the spring support surfaces 30 and 39, respectively, (see FIG. 13) and migrate upwards along the spring support surfaces 30, 39. The design space for the coil torsion spring 11 diminishing in axial direction during this process can cause the coil torsion spring 11 to impermissibly press the two sleeves 18 and 24 away from each other and thus, so to speak, axially burst the decoupler 1 apart.

Figure 12:
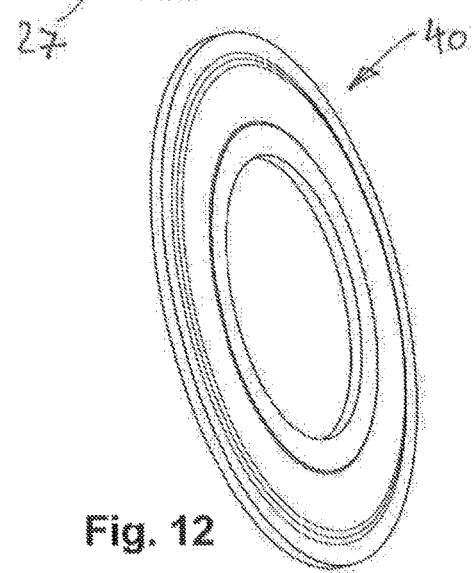
FIG. 12 illustrates a thrust washer in a perspective view.

As will become clear in a combined viewing with FIG. 2, the axial support of the second sleeve 18 is accomplished on the ball bearing 7 and not on the entraining disk 35 that is positioned on the hub 4 with a respective axial clearance to the second sleeve 18 on the one side and to a thrust washer 40 shown in FIG. 12 on the other side and is consequently free of axial load. The axial load is much rather transmitted from the second sleeve 18 to a slide mounted polyamide axial bearing ring 41 and, further, via the thrust washer 40 that is bent at an angle radially inwards towards the ball bearing 7, to the inner ring of the ball bearing 7.

FIGS. 13 to 16 show the third sleeve 24 assembled with the hub 4 or as an individual part, as the case may be. The third sleeve 24 is pressed onto the hub 4 through an inner ring 42 angularly bent from the collar 26, the third sleeve 24 also comprising an outer ring 43 bent angularly from the intermediately arranged collar 26, on which outer ring 43 the radial bearing ring 8 is received (see also FIG. 2). The axial ramp-shaped ascending spring support surface 39 is likewise formed by three stampings 44 that are formed on the collar 26, and this support surface likewise rests directly on the coil torsion spring end extending in this region, with the step 38 being exclusively in pressure contact with the front face 32 of the coil torsion spring end.

For enabling a simple turning machining, the hub 4 possesses a substantially uniform outer diameter that is slightly receded only on the generator-side hub end and forms a shoulder 45 for the inner ring of the ball bearing 7 pressed thereon (see FIG. 2) at this location.

LIST OF REFERENCE NUMERALS

1 Belt pulley decoupler/decoupler
2 Belt pulley
3 Outer peripheral surface of the belt pulley
4 Hub
5 Central portion of the hub
6 Inner polygonal toothing
7 Rolling bearing/ball bearing
8 Sliding bearing/radial bearing ring
9 Widening
10 One-way clutch/wrap-around band
11 Decoupler spring/coil torsion spring
12 Axis of rotation
13 First end of wrap-around band
14 Inner peripheral surface of the first sleeve
15 First sleeve
16 Second end of wrap-around band
17 Inner peripheral surface of the second sleeve
18 Second sleeve
19 First axial portion
20 Second axial portion
21 Axial stop
22 (inner) Axial stop
23 (outer) Axial stop
24 Third sleeve
25 Collar of the second sleeve
26 Collar of the third sleeve
27 Outer ring of the second sleeve
28 Outer peripheral surface of the outer ring
29 Stamping
30 Spring support surface
31 Step
32 Front face of the coil torsion spring end
33 Projection
34 Recess
35 Entraining disk
36 End of the recess
37 End of the recess
38 Step
39 Spring support surface
40 Thrust washer
41 Axial bearing ring
42 Inner ring of the third sleeve
43 Outer ring of the third sleeve
44 Stamping
45 Shoulder of the hub

The invention claimed is:

1. A belt pulley decoupler for transmitting a drive torque from a belt of an auxiliary unit belt drive to a shaft of an auxiliary unit, the belt pulley decoupler comprising:
   a belt pulley;
   a hub configured to be fixed on the shaft;
   a decoupler spring and a wrap-around band arranged in series along a drive torque flow path between the belt pulley and the hub, the wrap-around band extending about an axis of rotation of the belt pulley decoupler and arranged radially between the belt pulley and the decoupler spring;
   a first sleeve rotationally fixed relative to the belt pulley and having an inner peripheral surface; and
   a second sleeve rotatable within the belt pulley and having an inner peripheral surface;
   wherein, under transmission of the drive torque, the wrap-around band widens radially,
   wherein the wrap-around band includes a first end that extends on a belt pulley-side in the drive torque flow path and is braced against the inner peripheral surface of the first sleeve and a second end that extends on a decoupler spring-side in the drive torque flow path and is braced against the inner peripheral surface of the second sleeve, and
   wherein the first sleeve comprises a first axial portion having the first end of the wrap-around band extending therefrom, and a second axial portion receiving a radial bearing ring that slidingly mounts the belt pulley on the hub.

2. The belt pulley decoupler according to claim 1, wherein the wrap-around band is curved entirely from the first end to the second end.

3. The belt pulley decoupler according to claim 1 wherein the first axial portion includes an axial stop configured to delimit the wrap-around band, and the second axial portion includes axial stops for delimiting the radial bearing ring.

4. The belt pulley decoupler according to claim 3, wherein the first sleeve is a shaped sheet metal part, the axial stops being projections extending radially inwards from the inner peripheral surface of the first sleeve.

5. The belt pulley decoupler according to claim 4, wherein the projections include local stampings of the inner peripheral surface of the first sleeve.

6. The belt pulley decoupler according to claim 4, wherein the projections include a continuous roller-burnished step on the inner peripheral surface of the first sleeve.

7. The belt pulley decoupler according to claim 1, wherein the decoupler spring is a coil torsion spring that extends about the axis of rotation of the belt pulley decoupler and is clamped-in between a collar of the second sleeve and a collar of a third sleeve which is rotationally fixed on the hub.

8. The belt pulley decoupler according to claim 7, wherein the second sleeve and the third sleeve are shaped sheet metal parts and the collars contact ends of the coil torsion spring.

9. The belt pulley decoupler according to claim 7, wherein the third sleeve possesses an outer ring that is bent angularly from the collar of the third sleeve which receives the radial bearing ring.

10. A belt pulley decoupler for an automotive engine, comprising:
   a belt pulley;
   a hub configured to be fixed on a shaft of an auxiliary drive unit driven by a belt;
   a decoupler spring located along a torque flow path between the belt pulley and the hub;
   a first sleeve rotationally fixed relative to the belt pulley and having an inner peripheral surface;
   a second sleeve rotatable within the belt pulley and having an inner peripheral surface; and
   a wrap-around band located radially between the belt pulley and the decoupler spring, the wrap-around band including a first end braced against the inner peripheral surface of the first sleeve and a second end braced against the inner peripheral surface of the second sleeve;
   wherein the first sleeve comprises a first axial portion contacting the first end of the wrap-around band, and a second axial portion receiving a radial bearing ring that slidingly mounts the belt pulley on the hub.

11. The belt pulley decoupler of claim 10, wherein the wrap-around band is helically shaped from the first end to the second end.

12. The belt pulley decoupler of claim 10, wherein the first axial portion includes an axial stop configured to limit movement of the wrap-around band, and the second axial portion includes an axial stop configured to limit movement of the radial bearing ring.

13. A belt pulley decoupler for an automotive engine, comprising:
   a belt pulley;
   a hub configured to be fixed on a shaft of an auxiliary drive unit driven by a belt;
   a first sleeve rotationally fixed relative to the belt pulley and having an inner peripheral surface;
   a second sleeve rotatable within the belt pulley and having an inner peripheral surface;
   a decoupler spring; and
   a wrap-around band located radially between the belt pulley and the decoupler spring, and having a first end supported by the inner peripheral surface of the first sleeve and a second end supported by the inner peripheral surface of the second sleeve;
   wherein the decoupler spring is connected in series with the wrap-around band along a torque flow path between the belt pulley and the hub; and
   wherein the decoupler spring is a coil torsion spring that is clamped-in between a collar of the second sleeve and a collar of a third sleeve which is rotationally fixed on the hub.

14. The belt pulley decoupler of claim 13, wherein the second sleeve directly contacts an inner surface of the belt pulley.

15. The belt pulley of claim 13, wherein the belt pulley, the hub, the first sleeve, the second sleeve, and the wrap-around band are all coaxial about a central axis.

\* \* \* \* \*